United States Patent Office 3,508,459
Patented Apr. 28, 1970

3,508,459
METHOD OF FORMING BLANKS IN A SWING ARM CUTTING PRESS
Georg Lischer, Langen, and Jakob Gaus, Frankfurt am Main, Germany, assignors to Maschinenfabrik Moenus A.G., Frankfurt am Main, Germany
Filed Sept. 6, 1967, Ser. No. 665,806
Claims priority, application France, Nov. 3, 1966, 82,327
Int. Cl. B65h 17/00
U.S. Cl. 83—23      8 Claims

ABSTRACT OF THE DISCLOSURE

A conventional cutting press which is employed in the production of blanks made of artificial or natural leather, textile, plastic or other sheet material can be converted to facilitate cutting of blanks from sheets whose width exceeds the width of the fixed table in the conventional press. To this end, the table is movable sideways and has a width which at least equals the width of the widest sheet so that the table can move successive or selected portions of a sheet section into the range of blank-forming devices. Such blank forming devices may include one or more dies which can be placed on top of material on the table and a vertically movable swing arm which can force the die or dies into and through the material on the table.

BACKGROUND OF THE INVENTION

The present invention relates to cutting presses in general, and more particularly to improvements in a method of removing blanks from sheets of composition leather, textile or like materials in swing arm cutting presses.

The invention also relates to a method of removing from sheets of flexible material blanks which can be utilized in the manufacture of shoes, sandals, slippers and/or other articles of footwear.

At the present time, stamping of blanks from relatively wide webs or sheets of woven textile, synthetic plastic, composition leather or like material is carried out in so-called beam cutting presses, sole cutting butt presses or large double swing-arm presses. Such machines are large, heavy and bulky and can be employed with advantage in large factories or in certain types of workshops for special purposes, particularly for cutting of hard, thick or tough sheets of textile, plastic or the like. However, heavy-duty machines are less satisfactory for use in various departments of shoe manufacturing plants because the sheets from which the blanks must be cut are normally thin and can be cut by resorting to much lighter and hence more compact, less expensive and handier machines. On the other hand, manufacturers of sheet material for use in the production of blanks in the manufacture of footwear prefer to furnish such material in the form of bales, stacks or rolls of considerable width, i.e., preferred sizes of sheets or webs cannot be readily manipulated in presently known lightweight machines, particularly in so called swing-arm cutting presses which are popular in shoe manufacturing plants. Such cutting presses normally comprise a fixed table located below an arm which is swingable about a vertical axis and can move up and down to force a die into a sheet which has been placed onto the table whereby the die removes a blank. The die or dies can be located in desired positions so as to form as many blanks as possible with minimal waste in sheet material. As a rule, the table can accommodate a section of sheet material which has a width of 920 and a length of 460 millimeters, and the swing arm can be pivoted to a large number of positions so that the entire top face of the table is within the operating range of the arm. If such conventional presses are employed for stamping of blanks from webs or sheets whose width exceeds 920 millimeters, it is necessary to shift the sheet sideways with reference to the table in order to insure maximum utilization of the material, i.e., to remove blanks from each and every region of the sheet. The shifting of sheets consumes much time and effort and is likely to result in deformation of the material, particularly in the stamping of blanks from sheets of woven textile material. Large portions of a wide sheet overhang the table at one or both sides and are likely to interfere with movement of workers; furthermore, the rolls of convoluted sheet material tend to tilt in response to sidewise movement with reference to the frame of the press and the material which overhangs the sides of the machine frame is likely to be contaminated or torn by careless workmen or on contact with the floor.

SUMMARY OF THE INVENTION

It is an important object of our invention to provide a novel and improved method of stamping blanks from relatively wide sheets or webs of textile, composition leather or like material in such a way that the full width of each section which is in the blank removing zone of a cutting press is fully supported from below and is held out of contact with the floor, with the frame of the press and out of the way of persons in charge of the stamping operation.

Another object of the invention is to provide a method according to which removal of blanks from each region of a relatively wide sheet can be carried out with a minimum of effort, according to which selected portions of a wide sheet can be placed into the material removing zone of a cutting press in a fully or partly automatic way, and according to which the supply of sheet material is not likely to tilt or to otherwise leave its optimum position during removal of blanks.

Our invention resides in the provision of a method of removing blanks from sheets of textile, composition leather or like materials. The method comprises the steps of feeding a sheet lengthwise to place a first portion of a first section of the sheet into a materal removing zone whose width is less than the width of the sheet so that at least one second portion of the sheet is outside of the material removing zone, supporting the entire first section from below, removing one or more blanks from the first portion of the first section while such first portion remains in the material removing zone, moving the sheet sideways to place the second portion or portions of the first section into the material removing zone and removing one or more blanks from such second portion or portions, and feeding the sheet lengthwise and moving it sideways between lengthwise movements to respectively place first and second portions of successive sections into the material removing zone.

The material removing zone is preferably of substantially rectangular outline and the sheet is preferably fed in a horizontal plane. A supply of sheet material can be accumulated upstream of the material removing zone and the material of such supply can be fed stepwise across and transversely of the material removing zone. For example, the supply may contain a roll or a stack of folded sheet material. The material which remains upon removal of blanks can be collected in the form of rolls or the like, preferably immediately downstream of the material removing zone.

Thus, by the simple expedient of supporting entire sections of sheet material from below and of moving the thus supported sections sideways in one or more stages, each portion of each section can be placed into the material removing zone without overhanging of marginal portions of the sheet. The material removing zone can be defined by a stationary base plate or support which carries a transversely movable table or platform having a width which at least equals the width of a sheet. The removal of blanks can be effected by placing one or more dies onto that portion of a section which is located above the support and by causing a swing arm to move downwardly and to press the die into the material on the table.

The novel features which are considered as characteristic of the invention are set forth in particular in the appended claims. The cutting press itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENTS

Figure 1:
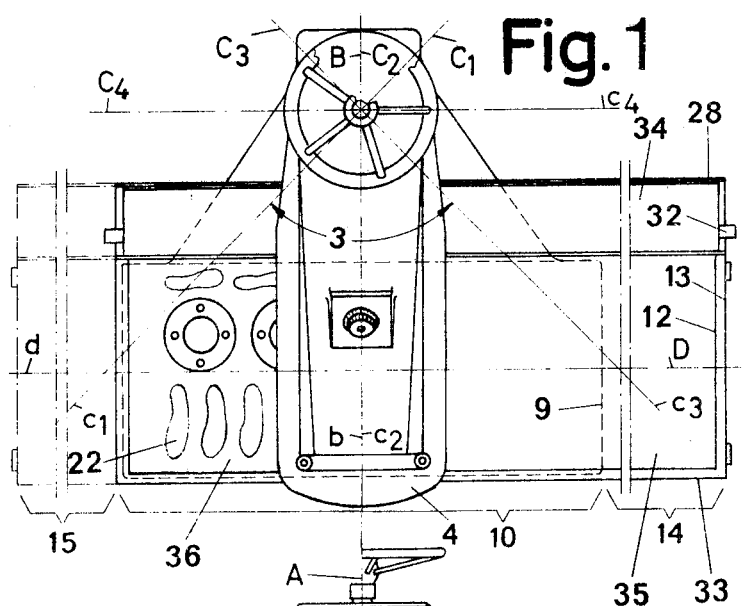
FIG. 1 is a somewhat schematic top plan view of a cutting press which can be employed for the practice of our method.

The drawing shows a cutting press which comprises a table 12 reciprocable in a horizontal plane along guide means or ways 12a mounted on a base or main support 12b. A double-acting cylinder and piston unit 12c is carried by the support 12b between the ways 12a and is coupled to the table 12 to move the latter back and forth (at right angles to the plane of FIG. 2) between two end positions and through one or more intermediate positions.

The support 12b further carries a column 12d for a swing arm 4 which can move up and down to perform working (downward) and return (upward) strokes and to thereby force the cutting edges of one or more dies 26 into the material of a sheet 24 which overlies the top face of the table 12. The unit which moves the arm 4 up and down is preferably accommodated in the column 12d. The arm 4 is swingable through an angle 3 between two end positions indicated in FIG. 1 by phantom lines $c_1$–$C_1$ and $c_3$–$C_3$. The line $c_2$–$C_2$ denotes the median or neutral position of the arm 4 and is located in the central vertical symmetry plane $b$-B of the press. The line $a$-A denotes the vertical pivot axis of the arm 4.

The broken-line rectangle 9 denotes in FIG. 1 the material removing zone in the cutting press, namely, that zone which can support sheet material 24 in the range of the swing arm 4. This rectangle also represents the size of the fixed table in a conventional cutting press. As stated above, this size is normally 920.460 millimeters, i.e., considerably less than the width of many types of sheets which are often supplied in widths of 1,430 and 1,730 millimeters.

In accordance with a feature of our invention, the width of the table 12 exceeds considerably the width of the zone 9 so that the table can support from below a full section of the sheet 24. Depending on the width of sheets 24, the top face of the table 12 can support sections having a length of 460 and a width of 1,430 or 1,730 millimeters. Since the table 12 is reciprocable along the ways 12a, it can place any desired portion of a section into the range of the arm 4 and of a die 26 which is placed between the sheet and the underside of the arm.

The line $d$–D denotes in FIG. 1 the central longitudinal symmetry plane of the table 12, and such plane is normal to the plane $b$–B. Depending on the height of the die 26, the working stroke 2 of the arm 4 will cover a greater or lesser portion of the maximum distance between the underside of the arm and the upper side of the table 12.

FIG. 1 illustrates the table 12 in the right-hand end position 14 in which the table maintains a first portion 36 of a sheet section in the material removing zone 9 whereas a second portion 35 of the same section extends to the right of the zone 9 close to the right-hand edge 13 of the table 12, but is fully supported by the top face of the table, i.e., the same as the portion 36. The operator proceeds to place the die 26 (or two or more identical or different dies) onto selected regions of the portion 36 and to effect working strokes of the arm 4 so that the cutting edges of the die or dies separate from the portion 36 blanks 22 in the form of soles, uppers or the like. The material of the sheet 24 cannot overhang the sides of the press because its width equals or is less than the width of the table 12.

Figure 2:
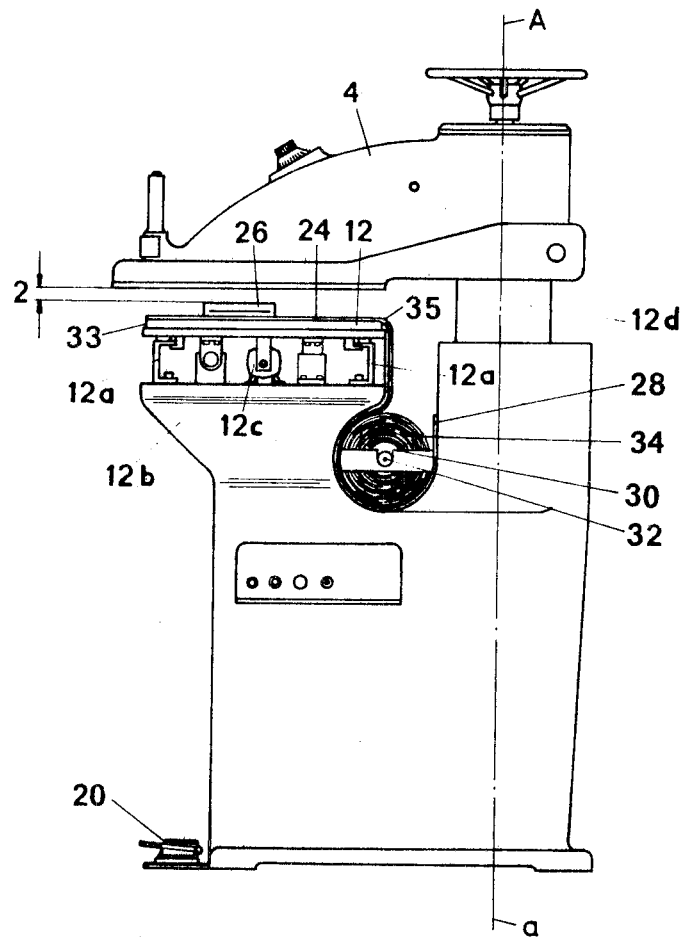
FIG. 2 is a side elevational view of the press.

When the table 12 is moved to the left-hand end position 15 of FIGS. 1 and 2, the portion 35 of the sheet section on the top face of the table is located in the zone 9 so that it can yield a certain number of blanks by manipulating the die 26 and arm 4 in the same way as described above. The arm 4 can be swung about the axis $a$–A, either by hand or by a suitable motor or transmission, not shown. If the width of the table 12 and sheet 24 is more than twice the width of the zone 9, each section of the sheet 24 will be treated in three or more stages, i.e., the controls (including a foot pedal 20 which regulates a four-way valve for the cylinder 12c) will be arranged to arrest the table 12 in at least one intermediate position between the end positions 14, 15. The same applies if the maximum range of the arm 4 (between the lines $c_1$–$C_1$ and $c_3$–$C_3$) is less than shown in FIG. 1 so that the arm cannot effect removal of blanks from the entire portion 36. It is clear that the width of the table 12 may exceed 1,730 millimeters; it will depend on the width of sheets and on the availability of space in a manufacturing plant. That portion of the table 12 which overlies the zone 9 is indicated by the numeral 10. This portion 10 may constitute about one-half of the table.

The rear portion of the table 12 carries a trough 28 or a like magazine for a supply 34 of sheet material. This magazine can be filled by pivoting the arm 4 to the inoperative position indicated by the line $c_4$–$C_4$. If the supply 34 is in the form of a roll (as shown in FIG. 2), it can be introduced into the magazine 28 from one end of the table 12 without changing the position of the arm 4. The core 32 of the supply 34 can be received in a pair of bearings 30 which travel back and forth with the table 12. The operator then grasps the leading edge of the sheet 24 and draws it along the top face and to the front edge 33 of the table 12 so that a first section of the sheet is properly supported from below and that the portion 35 or 36 of such first section is located in the zone 9. Once the first section is used up, the operator withdraws from the magazine 28 a second section, and so forth, and each section is moved sideways to place each of its portions into the range of the arm 4.

The front edge 33 of the table 12 can support a second magazine or trough which collects the waste, i.e., the material which remains upon removal of blanks 22. Such waste can be rolled up or collected in the form of panels or pleats.

The operator can proceed systematically or can remove blanks at random. For example, one mode of removing blanks systematically includes feeding a section of the sheet 24 by hand to place it over the table 12 in the right-hand end position 14 of FIG. 1 or 3, moving the arm 4 to the end position indicated by the line $c_1$–$C_1$, removing blanks 22 from the portion 36 in a direction toward the portion 35 and swinging the arm 4 toward the position indicated by the line $c_3$–$C_3$, moving the table 12 to the end position 15, removing blanks 22 from the portion 35 in a direction toward the remainder of the portion 36 and swinging the arm 4 toward the position indicated by the line $c_1$–$C_1$, feeding a fresh section of the sheet 24 onto the table 12, and repeating the just described steps to remove blanks from such fresh section.

Figure 3:
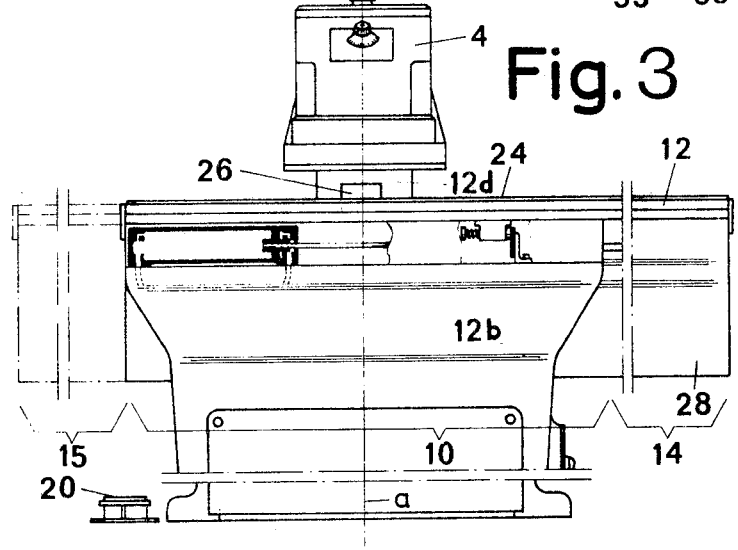
FIG. 3 is a front elevational view of the press.

The press of FIGS. 1-3 can be obtained by simple conversion of an existing press. Also, the table 12 is preferably removable so that it can be replaced by another reciprocable table or by a fixed table of standard dimensions. Thus, a conventional press can be converted into a press with reciprocable table or vice versa.

The magazine 28 can be replaced by a differently configurated and/or dimensioned magazine, and the supply 34 can be replaced with a supply of folded, pleated or otherwise stored sheet material. The ways 12a prevent tilting of the table 12 and magazine 28 and the table can be provided with customary limit switches, valves, shock absorbers and like control elements to automatically arrest it in selected intermediate or end positions and to effect gradual deceleration prior to stoppage. The conduits, conductors, pushbuttons, levers and other components of the control and programming systems of the press are of conventional design and are not specifically shown in the drawing. The core 32 of the supply 34 can be engaged by one or more leaf springs or analogous braking devices to prevent uncontrolled unwinding of the sheet 24. It is further clear that the drive for the arm 4 and table 12 can be assembled of mechanically, pneumatically, hydraulically and/or electrically operated parts.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. A method of removing blanks from sheets of textile, leather or like materials in a swing arm cutting press of the type wherein the blanks are cut by discrete dies which are pressed against the material by the swing arm, comprising the steps of feeding a sheet lengthwise to place a first portion of a first section of the sheet into a material removing zone whose width is less than the width of the sheet so that at least one second portion of the first section is outside of the material removing zone; supporting the first section from below; removing blanks only from said first portion; moving the sheet sideways to place the second portion of the first section into said material removing zone and removing blanks only from said second portion; and feeding the sheet lengthwise and sideways to respectively place first and second portions of additional sections into said material removing zone.

2. A method as defined in claim 1, wherein said material removing zone is of substantially rectangular outline.

3. A method as defined in claim 1, wherein the sheet is fed in a substantially horizontal plane.

4. A method as defined in claim 1, further comprising the steps of accumulating a supply of sheet material immediately upstream of said material removing zone and feeding the material of said supply across said zone to place selected portions of successive sections of the sheet into said zone.

5. A method as defined in claim 4, wherein said supply contains a roll of convoluted sheet stock.

6. A method as defined in claim 1, further comprising the step of collecting the remaining material of successive sections immediately downstream of said material removing zone.

7. A method as defined in claim 1, further comprising the step of retaining a supply of sheet material ahead of said material removing zone and moving said supply sideways together with the sheet whose sections are being cut in said material removing zone.

8. A method as defined in claim 7, wherein siad sections of the sheet are withdrawn from said supply manually by an operator located past said material removing zone.

References Cited

UNITED STATES PATENTS

| | | | |
|---|---|---|---|
| 112,381 | 3/1871 | Rhodes | 83—220 |
| 395,211 | 12/1888 | Breul | 83—220 |
| 813,049 | 2/1906 | Lindgren | 83—220 |
| 915,043 | 3/1909 | Robinson | 83—36 |
| 1,053,694 | 2/1913 | Anderson | 83—220 X |
| 2,489,583 | 11/1949 | Messenger | 83—50 |
| 3,248,978 | 5/1966 | Müller | 83—36 |

FOREIGN PATENTS 231,674    4/1925    Great Britain.

FRANK T. YOST, Primary Examiner

U.S. Cl. X.R.

83—34, 36, 50